3,096,186
METHOD OF PREPARING GLASS
Robert W. Hopkins, Hamilton, Ohio, assignor, by mesne assignments, to Pittsburgh Plate Glass Company
Filed May 11, 1959, Ser. No. 812,251
3 Claims. (Cl. 106—52)

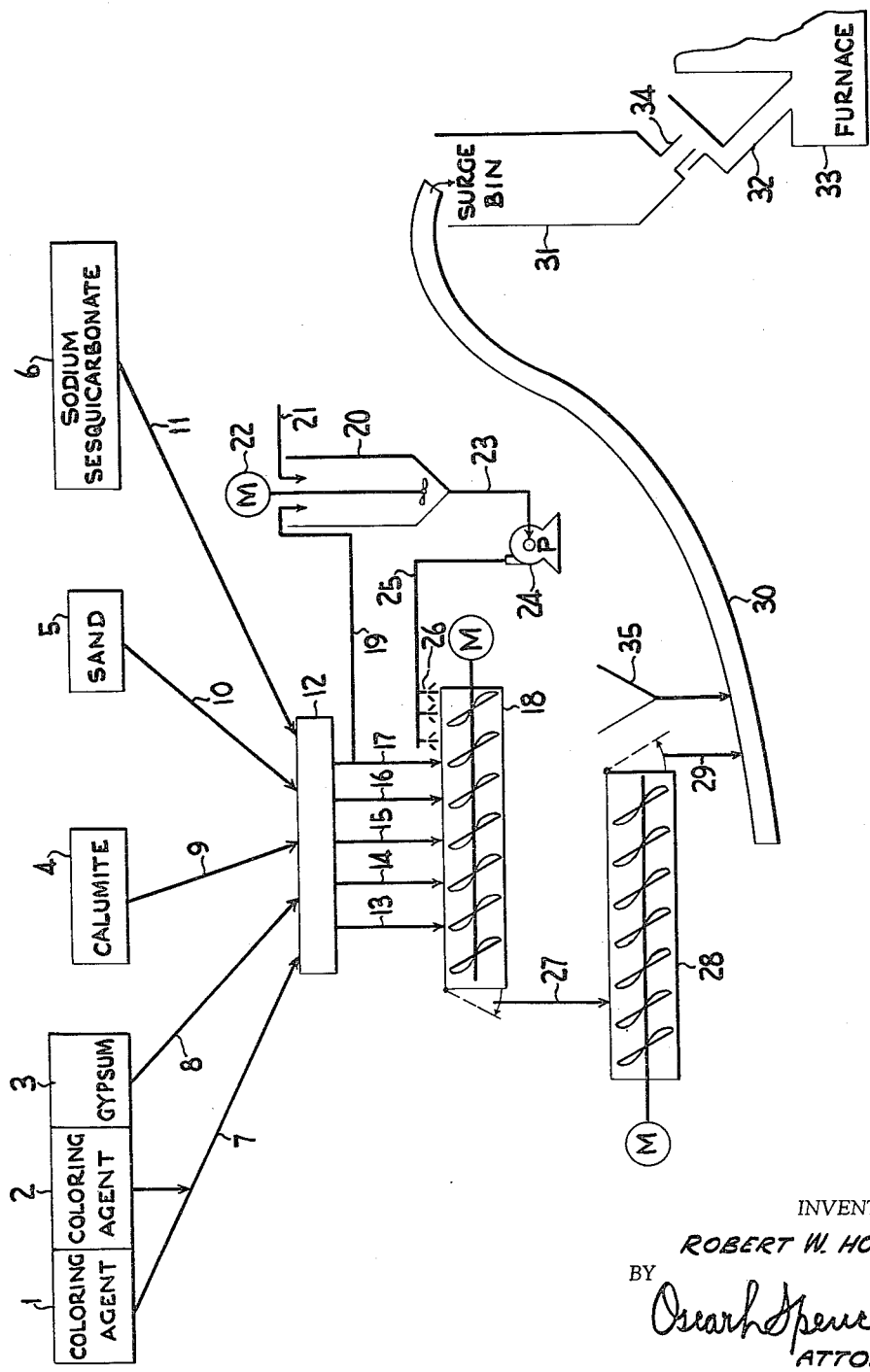

The present invention relates to the manufacture of glass. More particularly, the present invention relates to improvements in the preparation, mixing and handling of batches of glass making ingredients for use in a glass forming furnace.

In the manufacture of glass, many problems are encountered during the mixing and melting operations that seriously interfere with the efficiency and economy of the overall glass making operation. Thus, considerable carry-over of dust from melting furnaces is one particularly bothersome problem encountered which may require the employment of extensive dust trapping and collection equipment on furnace flues. Another associated problem concerns the occurrence of considerable internal dusting in the melting furnaces employed. Internal furnace dust contains alkali ingredients of the glass batches employed which causes considerable damage within the furnace to refractory linings necessitating costly and frequent shutdowns for replacement or repair of these linings on furnace upper sides and tops. Still further, considerable quantities of glass often are rejected because of the existence therein of blisters caused by trapped gases in the melted batches. Also quite frequently, seeds or unmelted sand particles in the glass products occur which also necessitates the rejection of product. Considerable dusting during the mixing and handling operations also occurs rendering this operation bothersome and the batches often non-uniform. It has been found in accordance with this invention that many of the problems hereinabove referred to may be eliminated or minimized to a great extent and that other advantageous operational conditions may be obtained. Thus, dusting in the mixing and conveying operations as well as the furnace melting operations and carry-over problems formerly encountered are substantially eliminated. The frequency of the production of inferior glass containing blisters and/or seeds is substantially reduced. The melting time for any specific batch of glass making ingredients in a furnace is substantially reduced thereby providing increased furnace capacity. Refractory linings of glass melting furnaces are maintained in operational condition for considerably longer periods of time when glass batches prepared in accordance with this process are employed. In addition, uniform batching is easily accomplished.

Thus, it has been found according to this invention that in preparing batches of glass making ingredients the above enumerated advantages may be obtained by adding at least a portion of the alkali requirement of the glass batch ingredients as a solution of a sodium sesquicarbonate. Preferably, the addition of the sodium sesquicarbonate is so conducted that it is added to the batch ingredients as an aqueous alkaline solution. Though it is not intended or desired that the invention be limited by any particular theory with respect to the accomplishment of the superior properties obtainable by the batches prepared in this manner, the addition of sodium sesquicarbonate to the glass batch as an aqueous solution produces a coating effect on the sand particles present in the batch. This coating or encasement of the sand content of the batch ingredients, it is believed, provides more intimate contact and greater heat transfer efficiency between the alkali and the sand present to assist in the melting operation. The intimate contact of sand particles and the sodium sesquicarbonate results in the formation of novel agglomerates which are less susceptible to dusting than individual sand or alkali particles normally encountered in standard mixed glass batches. The batches produced are wet, free flowing masses. In addition, the utilization of sodium sesquicarbonate as the alkali ingredient of the glass batch employed with a portion of the sodium sesquicarbonate content thereof added as an aqueous solution provides individual sand particles in the mixed batch which are completely coated with the alkali sesquicarbonate and results in the production of a mix which maintains its moisture indefinitely.

The aqueous solutions of alkali added to glass making ingredients are prepared in conventional digesting equipment. The amount of alkali added to the batch in aqueous form will determine the quantity of water and temperatures employed in solubilizing the alkali. While the quantity of alkali added to a particular batch may be subject to considerable variation, it is found advantageous to employ quantities in a range of between 5 and 40 percent basis the total weight content of the alkali in the batch, preferably between 10 and 25 percent. Quantities of alkali below the 5 percent value, while beneficial in achieving some advantages, are not as effective as additions conducted above this value or in the preferred ranges. The alkali solutions are saturated with respect to alkali and range generally from between 5 to about 45 percent alkali by weight of the solution in concentration depending on the temperature of the solvent employed. The water content of the batches prepared in accordance with this invention ranges between about 2 percent to about 20 percent by weight of the batch. Generally enough water is employed to introduce the desired percentage of alkali as a solution but the amount of water is below that quantity which will produce a slurry.

The alkali liquor addition to the batch ingredients may be accomplished in various ways. In one preferred mode of operation, for example, the alkali solution is added to the sand content of the batch and mixed therewith. After the mixing has been completed, the remainder of the alkali content is added in dry form and thoroughly mixed. The remainder of the batch ingredients are then added and mixed with the alkali-sand mixture and the batch is then ready for removal to a furnace or storage bin. While the alkali solution is preferably added to the sand prior to the addition of the remaining batch ingredients, the alkali solution addition may be conducted in other sequences if desired. Thus, for example, the sand content of a batch may be mixed in a dry condition with a portion of the alkali required in the batch. After thorough mixing of the dry sand and dry alkali, an alkali solution representing the balance of the alkali requirement of the finished batch may be added. Similarly, the sand content of a batch may be mixed with coloring ingredients utilized in the production of a particular glass along with a portion of the alkali content of the batch, and after thorough mixing, a subsequent addition of the remaining alkali requirement of the finished batch may be added as an aqueous solution.

The alkali content of the batch may be made up entirely of sodium sesquicarbonate or if desired sodium sesquicarbonate may be employed in combination with other alkali metal salts such as soda ash, sodium bicarbonate, sodium sulfate and the like. Generally when employing sodium sesquicarbonate with other alkali metal salts, the sodium sesquicarbonate will comprise at least 50 percent by weight of the alkali requirement of the batch. Quantities of soda ash, for example, in excess of 50 percent by weight of the alkali requirement of the batch may cause a setting up or hardening of the batch ingredients especially in batches employing water in weight percentages of only 10 percent or less.

The time required for mixing batch ingredients in accordance with the instant invention is of course subject to considerable variation depending upon the nature of the batch itself, the quantity of alkali added as an aqueous solution and other similar consideration. In general, the dry ingredients to which the aqueous alkali solution is added are mixed thoroughly in mechanical devices such as pug mills, rotary mills, tumblers, mix mullers and other like devices. The important consideration is the obtention of the maximum dispersion of particles uniformly throughout the batch.

As a further refinement in obtaining a maximum wetting of the sand particles contacted with the aqueous solutions of the sodium sesquicarbonate employed, various wetting agents may be employed in connection with the mixing operation. Thus, if desired, wetting agents may be added to the sodium sesquicarbonate solution contacted with the sand particles to thereby thoroughly wet these particles with the sodium sesquicarbonate solution contacted therewith. Any conventional wetting agent may be employed such as an alkyl aryl sulphonate. Utilization of wetting agents in the alkali metal aqueous solutions contacted with sand particles in accordance with this invention has a beneficial effect in providing a uniform coating of the sand particles with the aqueous alkaline solutions employed.

Operation of the process of this invention may be more readily understood from consideration of the accompanying drawing which illustrates diagrammatically one method which may be utilized in accomplishing the objects of the invention.

As shown in the drawing, the components of the batch ingredients are stored in bins 1, 2, 3, 4, 5 and 6. Though, as shown in the drawing, 6 bins are employed, more or less bins may be utilized as the requirements of the particular glass batch dictates. Appropriate feed lines 7, 8, 9, 10 and 11 are shown leading from the bins to weighing scale 12. From the weigh scale feed lines 13, 14, 15, 16 and 17 are utilized to transfer material to pug mill 18. Below the weigh scale 12 on the feed line 17 is a bypass line 19 utilized to transfer material from the scale to a digester 20. Associated with digester 20 is a stirring device 22 and a water inlet line 21. A discharge line 23 located in the bottom of the digester 20 is associated with a pump 24 and feed 25 equipped with suitable distribution means at the end thereof such as spray device 26. Located between pug mill 18 and a second pug mill 28 is a feed line 27 for discharging material from the pug mill 18 into the pug mill 28. Discharge 29 shown at the exit of the pug mill 28 is utilized to discharge material from the mill to a belt conveyor 30. Belt conveyor 30 discharges into a storage bin 31 from which material is then transferred via a discharge line 34 to a vibrating feeder 32 which terminates in the furnace 33. Located between the end of the belt conveyor and the storage bin is a cullet hopper 35.

In one mode of operation of the process in accordance with this invention, sodium sesquicarbonate is discharged from the bin 6 through line 11 to the weigh scale 12 in a quantity representing approximately 20 percent by weight of the total alkali requirement of the finished batch. After the material have been carefully weighed, it is discharged through line 19 into digester 20. Sufficient water is added to adequately digest the alkali content of the digester. Suitable agitation is provided by actuating the stirring device 22. The sand requirement for the glass batch is then introduced through line 10 to the weigh scale 12 and discharged from the scale through line 16 to the pug mill 18. After the sand has entered the pug mill, the contents of the digester 20 are discharged through line 22, pump 24, line 25 and sprayed on the sand particles. Pug mill 18 is actuated to provide adequate mixing of the alkali solution and sand particles contained therein. After suitable mixing has been accomplished, the remainder of the alkali requirement for the batch is added to the scale from bin 6 via line 11 and discharged via line 17 to the pug mill. The other ingredients contained in bins 1, 2, 3 and 4 are added similarly in required quantities and discharged through lines 13, 14 and 15 respectively to the pug mill 18. The materials are mixed in the pug mill for a sufficient period of time to produce a substantially uniform batch and are discharged through line 27 to pug mill 28 where further mixing is conducted. Upon completion of the mixing operation, the glass batch ingredients, which are now a wet, homogeneous, free flowing mixture, are then discharged through line 29 to the belt conveyor 30 from which they are transported to a storage bin 31. The batch ingredients entering the bin 31 are wet to the touch as well as in appearance. From storage bin 31 the wet ingredients are passed through line 34 to a vibrator feeder 32 and fed to the furnace 33 as required. If desired, material from the cullet hopper may be added to the batch ingredients on the belt conveyor.

Glass making ingredients mixed in the above described manner are found to be extremely desirable in glass melting characteristics exhibiting fast melting times with little or no dusting either internal or external during the melting operation.

In addition, mixed batches prepared in accordance with the teachings of this invention are found to contain sand particles which are completely coated with the alkali metal sesquicarbonate and in physical appearance the glass batches prepared present uniform particles which remain wet for an indefinite period of time. The batches are free flowing even though wet and are homogeneous in appearane.

The following examples are given as illustrative of some of the modes of operation which may be employed in conducting the process of this invention, but are not intended to limit the scope thereof.

*Example I*

A soda-lime batch was prepared from the following ingredients:

| | Grams |
|---|---|
| Sand | 200 |
| Limestone | 56 |
| Soda ash | 70 |

The above ingredients were placed in a glass jar, the jar was then covered and tumbled by hand for several minutes to insure thorough mixing of the ingredients. A ceramic crucible 95 millimeters deep and 65 millimeters in diameter was loaded with 50 grams of the mixed batch. The crucible was placed in a gas fired muffle furnace operated at 2600° F. for a period of 10 minutes. The crucible was then removed from the furnace, annealed and cut in half. The glass and partially melted batch contents of the crucible were then subjected to a visual examination. The results were as follows:

(1) Total glass and unmelted batch depth was 45 millimeters.

(2) Of the total depth, a depth of 42.75 millimeters was unmelted batch.

All measurements were made by a ruler at the cut surface of the sample.

*Example II*

A soda-lime glass batch was prepared from the following ingredients:

| | Grams |
|---|---|
| Sand | 200 |
| Limestone | 56 |
| Sodium sesquicarbonate | 101 |

15.15 grams of the sodium sesquicarbonate were dissolved in 30.8 grams of water at a temperature of 195° F. to provide a 33 percent by weight solution of sodium sesquicarbonate. The 200 grams of sand were placed in a glass jar and the entire 33 percent solution of sodium sesquicarbonate was added to the jar, the jar was covered and the contents thoroughly mixed by hand tumbling. The limestone and remaining sodium sesquicarbonate were then added to the jar, the jar again covered and the contents mixed by tumbling. The water content of the mix was 8.6 percent by weight. A 54.3 gram sample was placed in a ceramic crucible 95 millimeters deep and 65 millimeters in diameter. The crucible was placed in a gas fired muffle furnace operated at 2600° F. for a period of 10 minutes. The crucible was then removed from the furnace, annealed and cut in half. The solid contents of the crucible, glass and unmelted batch were then subjected to a visual examination and measurement. The results are as follows:

(1) Total glass and unmelted batch depth was 45 millimeters.

(2) Of the total depth, a depth of 32.05 millimeters remained unmelted.

As is readily apparent from the above examples, the use of sodium sesquicarbonate liquor additions to batch ingredients results in much faster melting of glass batches. Thus, while in Example I after 10 minutes heating, the product was only 5 percent by volume batch free (clear melted glass), the liquor treated batch using sodium sesquicarbonate heated for the same period of time and at the same temperature resulted in a product that was 29 percent by volume batch free (clear melted glass).

While the invention has been described with reference to certain specific examples, it is, of course, understood that it is not intended to be limited thereby except insofar as appears in the accompanying claims.

What is claimed:

1. A method of preparing glass by mixing and heating a mixture of glass making ingredients comprising sand and sodium sesquicarbonate, said sodium sesquicarbonate comprising at least 50 percent by weight of the total alkali of the glass making ingredients, which comprises forming an aqueous solution of between 5 and 40 percent by weight of the sodium sesquicarbonate content of the glass making ingredients, mixing said aqueous solution of sodium sesquicarbonate with said sand and the remainder of the sodium sesquicarbonate content of the batch, the amount of water present in the aqueous solution of sodium sesquicarbonate being not sufficient to produce a slurry but enough to produce a wet, free-flowing mixture, and feeding the wet, free-flowing mixture so formed into a glass forming furnace while wet and melting said wet, free-flowing mixture.

2. A method of preparing glass by mixing and heating a mixture of glass making ingredients comprising sand and alkali metal salts, including sodium sesquicarbonate wherein said sodium sesquicarbonate comprises at least 50 percent by weight of the total alkali of the glass making ingredients which comprises forming an aqueous solution of at least a portion of the sodium sesquicarbonate content of the ingredients, mixing said solution of sodium sesquicarbonate with the sand and the remainder of the ingredients to form a wet, free-flowing mixture, said aqueous solution of sesquicarbonate containing between 5 and 40 percent by weight of the alkali metal content of the batch ingredients and 2 to 20 percent water by weight, feeding the thus formed wet, free-flowing mixture while wet to a glass forming furnace and melting said wet, free-flowing mixture.

3. A method of preparing glass by forming and heating a mixture of glass making ingredients comprising sand and alkali metal salts, including sodium sesquicarbonate said sesquicarbonate comprising at least 50 percent by weight of the total alkali of the batch which comprises mixing an aqueous solution of a portion of the sodium sesquicarbonate content of the ingredients with the sand and the remainder of the batch ingredients to form a wet, free-flowing mixture, said aqueous solution of sesquicarbonate containing between 15 and 25 percent by weight of the alkali metal content of the ingredients to thereby form a wet, free-flowing mixture, feeding the thus formed wet, free-flowing mixture while wet to a glass forming furnace and melting said wet, free-flowing mixture.

References Cited in the file of this patent
UNITED STATES PATENTS

| | | |
|---|---|---|
| 1,312,784 | Galt | Aug. 12, 1919 |
| 2,366,473 | Bair | Jan. 2, 1945 |
| 2,478,151 | Bair | Aug. 2, 1949 |
| 2,611,712 | Ford | Sept. 23, 1952 |
| 2,813,036 | Poole | Nov. 12, 1957 |

OTHER REFERENCES

Hackh's Chemical Dictionary, 2nd Ed., 1937, p. 842.